Feb. 28, 1961  B. SMITH  2,972,976
STEERING CONTROL
Filed April 13, 1960
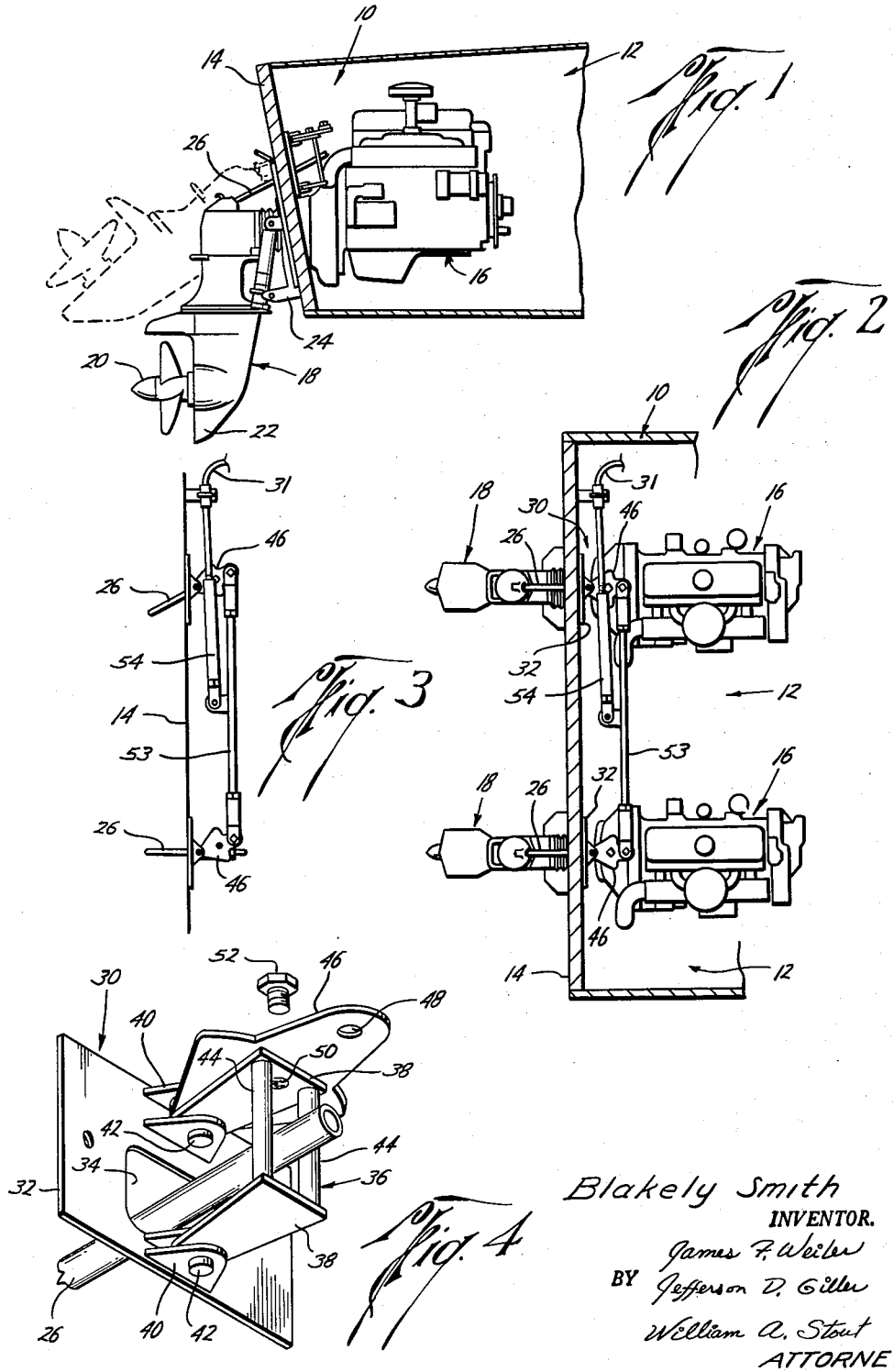
Blakely Smith
INVENTOR.
BY James P. Weiler
Jefferson D. Giller
William A. Stout
ATTORNEYS 2,972,976
Patented Feb. 28, 1961

2,972,976

STEERING CONTROL

Blakely Smith, 2002 Bolsover, Houston, Tex.

Filed Apr. 13, 1960, Ser. No. 21,919

6 Claims. (Cl. 115—35)

The present invention relates to steering controls and particularly to steering controls for inboard engine and outboard propelling units for boats.

In mounting an engine inboard in the stern of a boat and a propelling unit outboard the arrangement ordinarily is such that the outboard propelling unit may be tilted for beaching, trailer hauling, and may be tilted out of the water when the engine or propelling unit is not functioning for some reason so that the propelling unit will not provide drag to other propelling units, for example, when using multiple inboard engines and outboard propelling units.

In present inboard engine mounting and outboard propeller unit mountings when a propeller unit is tilted it is normally locked in a fore and aft position and, accordingly, under this condition it is not possible to steer the boat, that is, to turn the remaining propelling unit or units in the water.

It would be highly advantageous to provide a steering control so that the propelling units may be turned as a unit and when one of these units is not functioning, by a very simple and quick means the propelling unit may be disengaged from the steering control and tilted or raised out of the water so that the boat can be steered by the remaining propelling unit or units. It would also be highly advantageous to provide such a steering control by which better or a preferred adjustment for wheel turn is obtained. The present invention is directed to such a steering control.

It is therefore an object of the present invention to provide a steering control by which an outboard propelling unit can be tilted or raised and locked in a fore and aft position and, by a very simple adjustment, the boat can continue to be steered.

Yet a further object of the present invention is the provision of a steering control by which an improved or preferred adjustment for wheel turn is obtained.

Yet a further object of the present invention is the provision of a multiple steering control adapted for controlling steering of multiple inboard engine and outboard propelling units in which steering of the propelling units is controlled and in which one or more of the units may be raised or tilted, for example, raised out of the water and locked in a fore and aft position and, by very simple adjustment, the boat can be continued to be steered through the steering control.

Yet a further object of this invention is the provision of such a steering control which is relatively simple, rugged and durable, and which is easily installed and used.

Other and further objects, features and advantages of the present invention will appear from the following description of a presently preferred embodiment thereof, given for the purpose of disclosure, and taken in conjunction with the accompanying drawing, in which like character references designate like parts throughout the several views, and where:

Figure 1 is a fragmentary side view, partly in section, illustrating a steering control according to the invention attached to an inboard engine and outboard propelling unit, Figure 2 is a fragmentary top view illustrating a steering control according to the invention controlling steering of multiple inboard engine and outboard propelling units, Figure 3 is a fragmentary top view of the steering control illustrating steering by one of the propelling units and disconnection of the other of the propelling units, and Figure 4 is an enlarged, partially exploded perspective view illustrating the steering control of Figures 1–3, inclusive.

Referring now to the drawings, and particularly to Figures 1 and 2, there is shown the stern 10 of a boat 12, a fragment of which is shown provided with the transom 14.

Shown mounted in the stern 10 is the inboard engine 16 which is connected to and drives the outboard propelling unit 18 provided with the propeller 20, rudder 22, propeller adjustment angle arm 24, which propelling unit 18 can be tilted into the position illustrated in the dotted lines in Figure 1, by suitable means not shown, and when in this tilted position, is locked in a fore and aft position and cannot be turned for steering purposes such as when in the nontilted position as shown. The details of the propelling unit, engine and mounting are not shown nor is any detailed description thereof deemed necessary inasmuch as these details, as such, do not form the present invention and such an assembly is readily available on the market, for example, the Volvo-Penta Trans-Mount Drive combined with BB-70 engine.

As previously mentioned in inboard engine and outboard propelling units of the type shown in Figures 1 and 2, when the propelling unit is in the tilted position shown in the dotted lines in Figure 1, it is locked in a fore and aft position, that is in a position parallel to the long axis of the boat 12. Since the steering tiller 26 in previous installations are connected directly to the steering cord 31 (Figure 2) which is connected to the steering wheel at the forward end, both not shown, of the boat 12, steering of the boat 12 is thus prevented when utilizing multiple units, for example as shown in Figure 2. Thus, in previous installations, when one of the propelling units 18 is not functioning, it still must be permitted to remain in the water in order to obtain steering which provides a considerable drag to the boat. In addition, by directly connecting the steering cord 31 to the steering tiller 26 it is not possible to get a preferred adjusted ratio for wheel turn, that is a desired ratio of revolution of the wheel, not shown, with respect to the rudder 22. The steering control, generally designated by the reference numeral 30, permits steering of the remaining propelling units when one is in the tilted position and provides a desired adjusted wheel ratio.

The details of a presently preferred form of the steering control 30 are best illustrated in Figure 4, to which reference is now made. The steering control includes a mounting plate 32 for securing to the transom 14, and includes an opening 34 through which the steering tiller 26 loosely extends.

A yoke generally indicated by the reference numeral 36 is pivotally secured to the mounting plate 32 by the vertically-spaced plate-like members 38 being secured to the vertically-spaced pairs of brackets 40 and the pivot pins 42.

A pair of vertically-extending members or arms 44 are provided adjacent the outer ends of the plates 38 through which the steering tiller 26 extends so that as the yoke 36 is pivoted the steering tiller 26 is also pivoted. It should be noted that varying the location of the vertical arms 44 from the mounting plate 32 or lengthening or shortening the plates 46 changes the steering wheel revolution ratio which changes the leverage ratio. Also, the upper and lower members 38 are spaced a sufficient distance apart to permit limited vertical movement of the inner end of the steering tiller 26 sufficient to permit the tilting of the propelling unit 18 throughout its range of tilting.

At one end of the yoke 36, here shown as the upper end, a connecting plate 46 is pivotally secured to the mounting plate 32 by the brackets 40 and the pivot pin 42 which is provided with an opening 34 by which it is connected to the steering controls as presently described. The connecting plate 46 is detachably secured, as here shown in Figure 4, to the upper plate 38 by means of providing the aligned openings 50 through which the screw 52 extends.

Thus, when it is desired to turn the yoke 36, the screw 52 will be threaded through the opening 50 and cause the yoke to turn with the connecting plate 46. When it is desired to disconnect the yoke 36 from the steering controls, advantageously it simply requires unscrewing the screw 52. Thus, by a very simple and quick means, one of the propelling units 18 can be disconnected from the steering controls and be maintained in a tilted position, such as shown in the dotted lines in Figure 1, but full steering is exercised by the remaining unit or units and all drag is eliminated since the disconnected propelling unit 18 is titled upwardly out of the water.

Referring now to Figure 2, which illustrates multiple engines 16 and propelling units 18, in using the steering control 30 of the present invention, one each is connected for each combined inboard engine 16 and outboard propelling unit 18 by securing each mounting plate 32 to the transom 14 so that the steering tillers 26 extend through each opening 34, not shown in this view. Each connecting plate 46 of each steering control unit 30 is connected together by suitable connecting means, for example, the connecting rod 53, to which is connected the push-pull rod 54 which in turn is connected to the steering cord 31 secured to the steering wheel, not shown. In this connection it will be understood that the cord 31 while only shown connected to one end of the push-pull rod 54 for convenience of disclosure, is connected to both ends of the push-pull rod 54 so that it might be moved in either direction. Thus, upon turning the steering wheel, not shown, the cord 31 is moved thereby moving the push-pull rod 54, the connecting rod 52 and thus each yoke 36 and thereby each steering tiller 26 and each of the rudders 22 of the outboard propelling units 18.

In use, the steering controls 30 are connected and operated as previously described. When it is desired to elevate or tilt a single propelling unit 18 out of the water, such as shown in the dotted lines in Figure 1, the screw 52 (Figure 4) is removed. This permits the connecting plate 46 to move while the tilted or raised outboard propelling unit 18 is in a locked fore and aft position. Steering of the boat 12 may then continue in the normal manner. The functioning of the unit under these conditions is best illustrated in Figure 3 which illustrates the steering tiller 26 at the lower portion of the figure in a locked fore and aft position although the connecting plate 46, which has been disconnected from the yoke 36 as previously described, is in a pivoted position, the same as that of the connecting plate 46 shown at the upper portion of Figure 3 causing a turning of the steering tiller 26. Thus, by a single screw member or its equivalent the yoke 36 may either be connected or disconnected so that a particular outboard propelling unit is or is not turned when the steering wheel is turned.

As previously mentioned, while the steering control is particularly advantageous in multiple mountings of inboard engine and outboard propelling units for the reasons mentioned, it is also advantageous for providing a desired or adjusted wheel turn ratio, that is the ratio of revolutions of the wheel with respect to the rudder in both single and multiple installations. It also provides a very convenient means of connecting the steering controls to the steering tiller in both multiple and single mountings.

The present invention therefore is well adapted and suited to carry out the objects and attain the ends and advantages mentioned as well as others inherent therein.

While a presently preferred embodiment of the invention has been given for the purpose of disclosure, changes in details and arrangement of parts may be made which are within the spirit of the invention as defined by the scope of the appended claims.

What is claimed is:

1. The steering control for a rudder of a boat having a steering tiller operable by steering control means comprising, a yoke arranged to be pivotally connected to the boat adjacent the steering tiller, means on the yoke for receiving the steering tiller whereby movement of the yoke moves the steering tiller, a connecting member arranged to be pivotally connected to the boat proximate the yoke, said connecting member connectable to the steering controls, and means detachably connecting the connecting member to the yoke whereby operation of the steering control means moves the connecting member and thereby the yoke when connected thereto.

2. A steering control for a rudder of a boat having a steering tiller operable by steering control means comprising, a yoke, means on the yoke receiving the steering tiller whereby movement of the yoke moves the steering tiller, a connecting member connectable to the steering control means, means detachably connecting the connecting member to the yoke, and pivot means pivotally connecting the connecting member and yoke on the same pivot axis to the boat adjacent the steering tiller.

3. A steering control for multi-inboard engine and outboard propelling units mounted on a boat comprising, a yoke for each of said units, each said yoke including means receiving the steering tiller so that movement of the yoke moves the steering tiller, a connecting member detachably connected to the yoke, a connecting rod rigidly connecting each connecting member, and pivot means connecting each yoke and its associated connecting member to the boat so that each said yoke and its connecting member are pivoted on the same axis.

4. A steering control for a rudder having a steering tiller operable by steering controls within a boat comprising, an upper and a lower member, a pair of generally vertically-extending and horizontally-spaced members secured to said first-mentioned members spaced from their inner ends, a connecting member connectable to the steering controls of the boat, means detachably connecting the connecting member to one of said upper and lower members, a mounting bracket, and means pivotally connecting the inner ends of the upper and lower members and the inner end of the connecting member to the mounting bracket.

5. A steering control for multi-mounted inboard engine and outboard propelling units on a boat, each of said propelling units provided with a steering tiller extending into the stern of the boat comprising, a yoke for each steering tiller, each said yoke comprising an upper and a lower member, a pair of generally vertically-extending and horizontally-spaced members secured to said first-mentioned members spaced from their inner ends receiving the inner end of one of said tillers and permitting limited vertical movement of the inner end of said steering tiller, a connecting member, means detachably connecting the connecting member to one of the upper and lower members, a rod interconnecting each of said connecting members, said rod arranged to be connected to the steering controls of the boat, a mounting plate arranged to be secured to the transom of the boat, and pivot means pivotally connecting the upper and lower members and the connecting member on the same axis to the mounting plate.

6. The steering control of claim 5 where the means detachably connecting the connecting member to said one of said upper and lower members comprises a screw.

No references cited.